United States Patent
Yen et al.

(10) Patent No.: US 9,407,453 B2
(45) Date of Patent: Aug. 2, 2016

(54) METHOD OF MEDIUM ACCESS CONTROL TYPE DETECTION

(75) Inventors: Chia-Wei Yen, Taipei (TW); Jian-Li Mao, Suzhou (CN)

(73) Assignee: ECONET (Suzhou) Limited, Suzhou, Jiangsu Province, P.R.C.

( * ) Notice: Subject to any disclaimer, the term of this patent is extended or adjusted under 35 U.S.C. 154(b) by 198 days.

(21) Appl. No.: 13/557,217

(22) Filed: Jul. 25, 2012

(65) Prior Publication Data

US 2013/0036209 A1 Feb. 7, 2013

Related U.S. Application Data

(60) Provisional application No. 61/515,973, filed on Aug. 7, 2011.

(51) Int. Cl.
*G06F 15/177* (2006.01)
*H04L 12/413* (2006.01)
*H04W 8/00* (2009.01)
*H04L 29/12* (2006.01)
*H04W 64/00* (2009.01)
*H04L 29/06* (2006.01)

(52) U.S. Cl.
CPC ............ *H04L 12/4135* (2013.01); *H04L 29/06* (2013.01); *H04L 61/6022* (2013.01); *H04L 69/22* (2013.01); *H04W 8/00* (2013.01); *H04W 64/003* (2013.01)

(58) Field of Classification Search
CPC .. H04W 8/00; H04W 64/003; H04L 61/6022; H04L 29/06; H04L 69/22
USPC ........................................................ 709/220
See application file for complete search history.

(56) References Cited

U.S. PATENT DOCUMENTS

| | | | | |
|---|---|---|---|---|
| 5,451,958 A | * | 9/1995 | Schuermann | 342/42 |
| 6,041,063 A | * | 3/2000 | Povlsen et al. | 370/395.53 |
| 6,516,345 B1 | * | 2/2003 | Kracht | 709/220 |
| 6,560,234 B1 | * | 5/2003 | Ben-Michael et al. | 370/401 |
| 8,504,708 B2 | * | 8/2013 | Li et al. | 709/230 |
| 2002/0078247 A1 | * | 6/2002 | Lu et al. | 709/251 |
| 2004/0046638 A1 | * | 3/2004 | Kawasaki | 340/5.61 |
| 2005/0147073 A1 | * | 7/2005 | Hietalahti et al. | 370/338 |
| 2005/0251604 A1 | * | 11/2005 | Gerig | 710/120 |
| 2005/0254489 A1 | * | 11/2005 | Jain et al. | 370/389 |
| 2006/0083227 A1 | * | 4/2006 | Eldar | 370/389 |
| 2007/0271398 A1 | * | 11/2007 | Manchester et al. | 709/249 |
| 2008/0175265 A1 | * | 7/2008 | Yonge et al. | 370/447 |
| 2008/0304408 A1 | * | 12/2008 | Kraemer et al. | 370/230 |
| 2009/0322556 A1 | * | 12/2009 | Cook et al. | 340/870.02 |
| 2010/0215049 A1 | * | 8/2010 | Raza et al. | 370/401 |
| 2012/0230343 A1 | * | 9/2012 | Schrum, Jr. | H04L 12/5692 370/401 |
| 2012/0311683 A1 | * | 12/2012 | Klein et al. | 726/6 |

FOREIGN PATENT DOCUMENTS

CN 1930793 A 3/2007

* cited by examiner

*Primary Examiner* — Oleg Survillo
*Assistant Examiner* — Imran Moorad
(74) *Attorney, Agent, or Firm* — Winston Hsu; Scott Margo

(57) ABSTRACT

A method of medium access control (MAC) type detection for a communication device compatible of a plurality of media each conformed to a communication standard in a network system is disclosed. The method comprises generating a library, wherein the library includes at least a character for each medium, configuring a MAC layer of the communication device according to the library, and determining the existence of a medium according to the configuration result.

6 Claims, 6 Drawing Sheets

|  | Character 1 | Character 2 | ....... | Character M |
|---|---|---|---|---|
| MAC 1: Ethernet | Speed/duplex | ....... | ....... | ....... |
| MAC 2: WiFi | SSID | ....... | ....... | ....... |
| MAC 3: PLC | NPW | ....... | ....... | ....... |
| MAC 4: MoCA | Password | ....... | ....... | ....... |
| ....... | ....... | ....... | ....... | ....... |
| MAC N: ....... | ....... | ....... | ....... | ....... |

|  | Character 1 | Character 2 | ...... | Character M |
|---|---|---|---|---|
| MAC 1: Ethernet | Speed/duplex | ...... | ...... | ...... |
| MAC 2: WiFi | SSID | ...... | ...... | ...... |
| MAC 3: PLC | NPW | ...... | ...... | ...... |
| MAC 4: MoCA | Password | ...... | ...... | ...... |
| ...... | ...... | ...... | ...... | ...... |
| MAC N: ...... | ...... | ...... | ...... | ...... |

METHOD OF MEDIUM ACCESS CONTROL TYPE DETECTION

CROSS REFERENCE TO RELATED APPLICATIONS

This application claims the benefit of U.S. Provisional Application No. 61/515,973, filed on Aug. 7, 2011, entitled "MAC Type Auto Detection Method", the contents of which are incorporated herein in their entirety.

BACKGROUND

With rapidly growing of user's needs for accessing digital contents everywhere, various communication technologies have been developed for transmission of the digital contents. These communication technologies may be developed for different environments, different transmission speeds and/or different user requirements. In addition, several medium access control (MAC) protocols are established based on different communication standards, which define different communication methods based on heterogeneous mediums. For example, IEEE 1901 communication standard is used for power line (PLC), IEEE 802.11 communication standard is used for wireless communication (i.e. WiFi), IEEE 802.3 communication standard is used for Ethernet, and Multimedia over Coax Alliance (MoCA) communication standard is used for coaxial cables, and so on.

As a result, a MAC abstraction sub-layer is developed for convergence of these various media. Please refer to FIG. 1, which is a schematic diagram of an exemplary communication device 10 in a data plane. The communication device 10 may be a mobile phone, laptop, tablet computer, electronic book, modem, or portable computer system, and uses various media for communication. In FIG. 1, the MAC abstraction sub-layer is arranged between an upper layer and a plurality of MAC types of a MAC layer corresponding to a plurality of communication standards. The upper layer can be a network layer, a transport layer, an application layer or any layer responsible for processing the signalings and the packets received from the MAC abstraction sub-layer, and signalings and packets to be transmitted via the MAC abstraction sub-layer. The plurality of MAC types of the MAC layer may include Ethernet, WiFi, PLC and MoCA complied with to the IEEE 802.3 communication standard, IEEE 802.11 communication standard, IEEE 1901 communication standard and MoCA communication standard, respectively.

However, with current MAC abstraction sub-layer architecture, the MAC abstraction sub-layer is incapable to know what the underlying MAC type (e.g. Ethernet, WiFi, PLC or MoCA) of the MAC layer is. Thus, the MAC abstraction sub-layer cannot well control the MAC layer of the communication device. For example, the MAC abstraction sub-layer may configure improper parameters to the MAC layer due to uncertain underlying MAC type of the MAC layer, causing an invalid configuration or system error in the communication device.

SUMMARY

The present invention therefore provides a method of medium access control type detection, to solve the above-mentioned problems.

The present invention discloses a method of medium access control (MAC) type detection for a communication device compatible of a plurality of media each conformed to a communication standard in a network system. The method comprises generating a library, wherein the library includes at least a character for each medium, configuring a MAC layer of the communication device according to the library, and determining the existence of a medium according to the configuration result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram of a library according to an example of the present invention.

DETAILED DESCRIPTION

Figure 1:
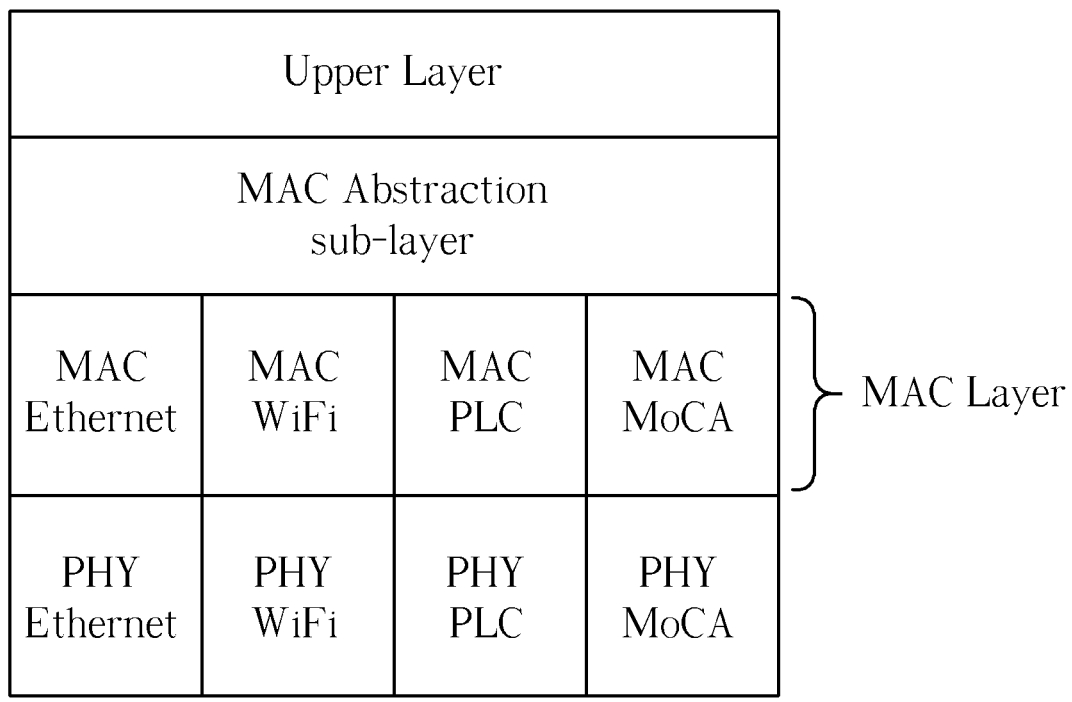
FIG. 1 is a schematic diagram of a communication device according to the prior art.
Figure 2:
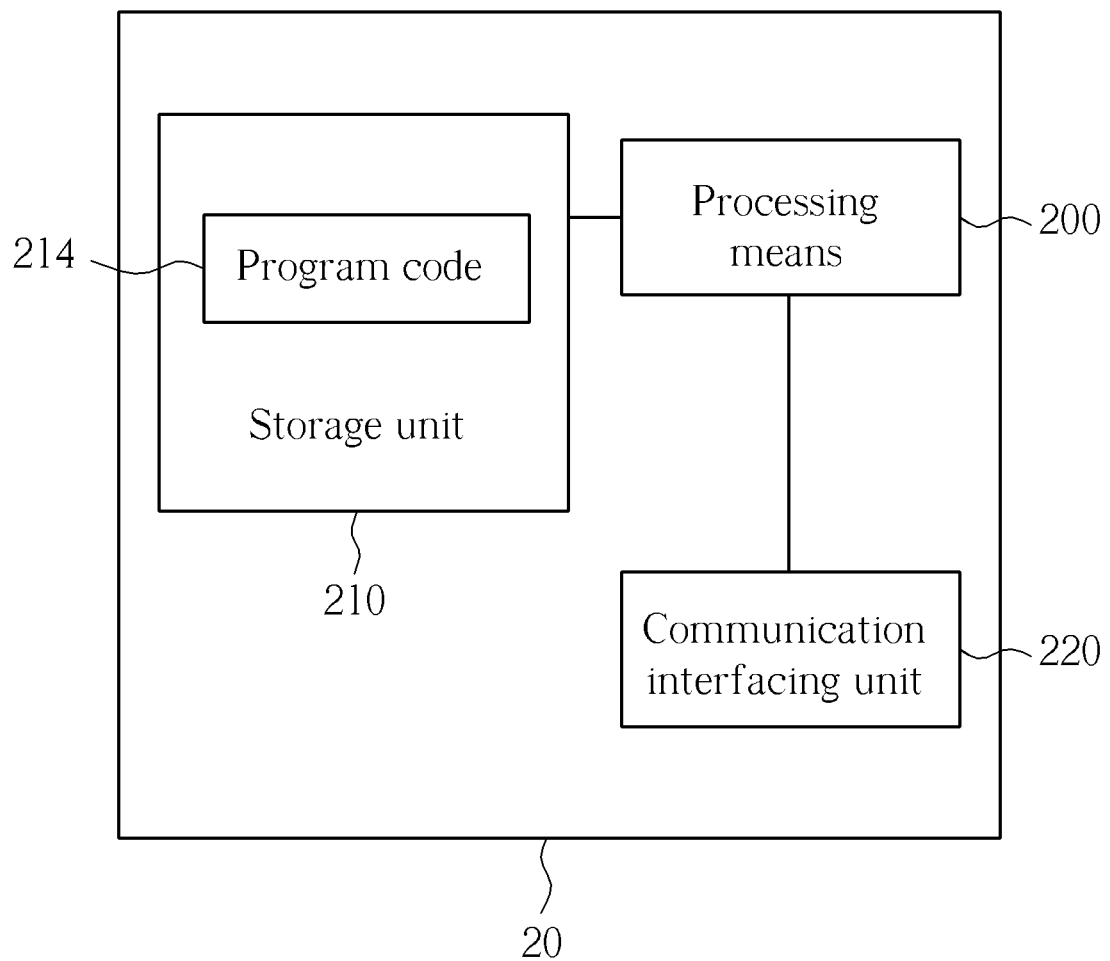
FIG. 2 is a schematic diagram of an exemplary communication device according to the present invention.

Please refer to FIG. 2, which is a schematic diagram of an exemplary communication device 20 according to the present invention. The communication device 20 can be a device shown in FIG. 1. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals with a unified terminal device or the network according to processing results of the processor 200.

Figure 3:
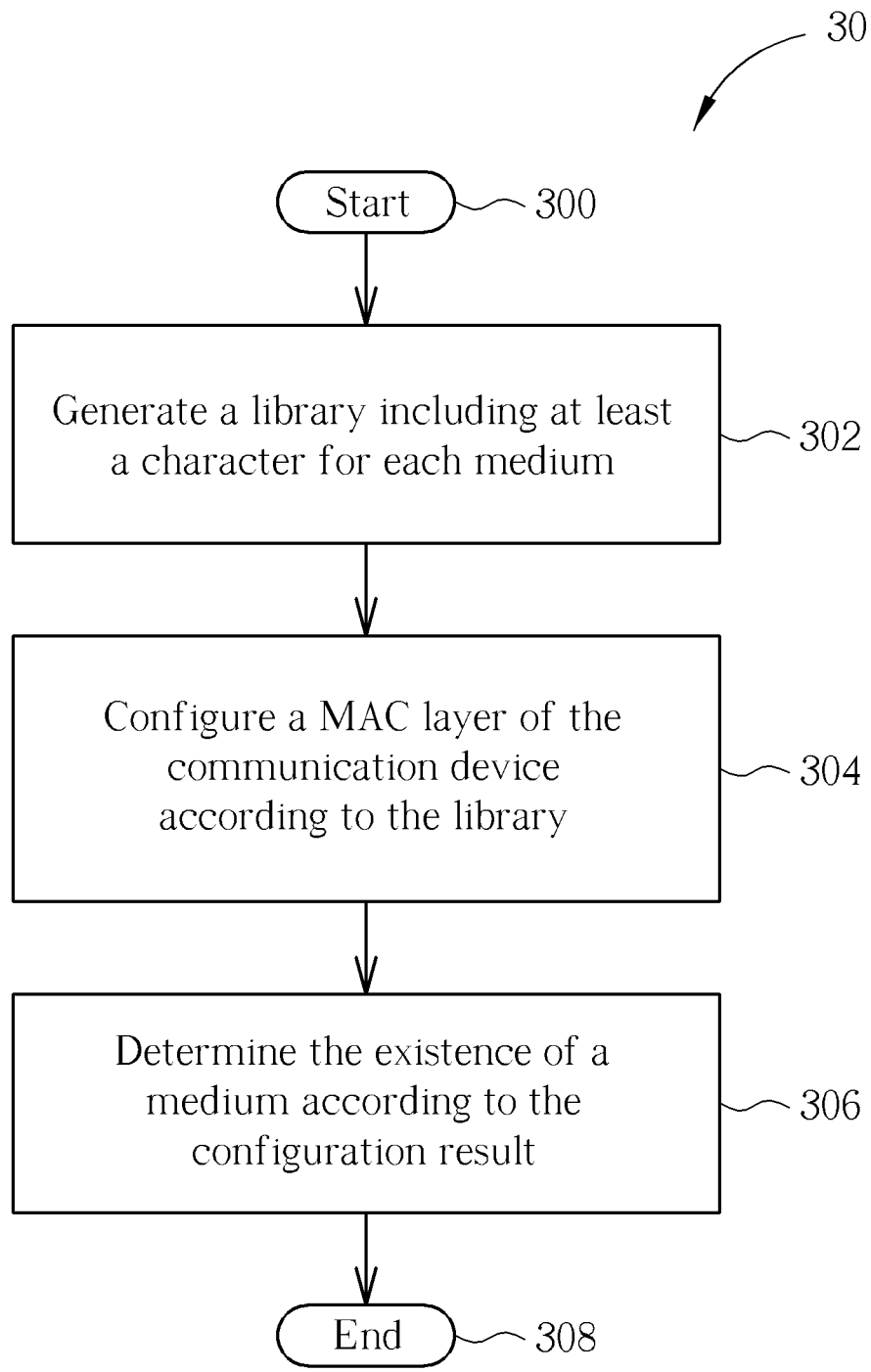
FIG. 3 is a flowchart of a MAC type detection process according to the present invention.

Note that, the main idea of the present invention is to provide a method of detecting the underlying MAC type in the MAC abstraction sub-layer. Please refer to FIG. 3, which is a flowchart of a MAC type detection process 30 according to an example of the present invention. The MAC type detection process 30 is utilized in the MAC abstraction sub-layer shown in FIG. 1. The MAC type detection process 30 may be compiled into the program code 214 of FIG. 2 and includes the following steps:

Step 300: Start.

Step 302: Generate a library including at least a character for each medium.

Step 304: Configure a MAC layer of the communication device according to the library.

Step 306: Determine the existence of a medium according to the configuration result.

Step 308: End.

According to the MAC type detection process 30, a feature library includes at least a character dedicated for a medium (or hereafter called MAC type) is generated and stored in the MAC abstraction sub-layer. The MAC abstraction sub-layer configures the underlying MAC layer with a parameter generated according to a character of a MAC type in the feature library, and then determines whether the MAC type of the MAC layer exists according to the configuration result. For example, if the configuration with the parameter is successful, the MAC abstraction sub-layer determines that the corresponding MAC type exists, whereas if the configuration with the parameter fails, the MAC abstraction sub-layer determines that the MAC type does not exist.

In detail, the feature library is generated by extracting a unique character of each medium based on a specification of the communication standard (IEEE 1901, IEEE 802.11, IEEE 802.3, and MoCA). For example, Service Set Identifier (SSID) only exists in WiFi, so SSID can be included in the feature library. Or, NPW only exists in PLC, so NPW can be included in the feature library. Further, please refer to FIG. 4, which is a schematic diagram of a library according to an example of the present invention. In FIG. 4, the library can be extended from 4 MAC types (e.g. Ethernet, WiFi, PLC, and MoCA) to N MAC types, and can be extended from 1 character (e.g. Speed/duplex, SSID, NPW, Password) for each MAC type to M characters for each MAC type.

Figure 5:
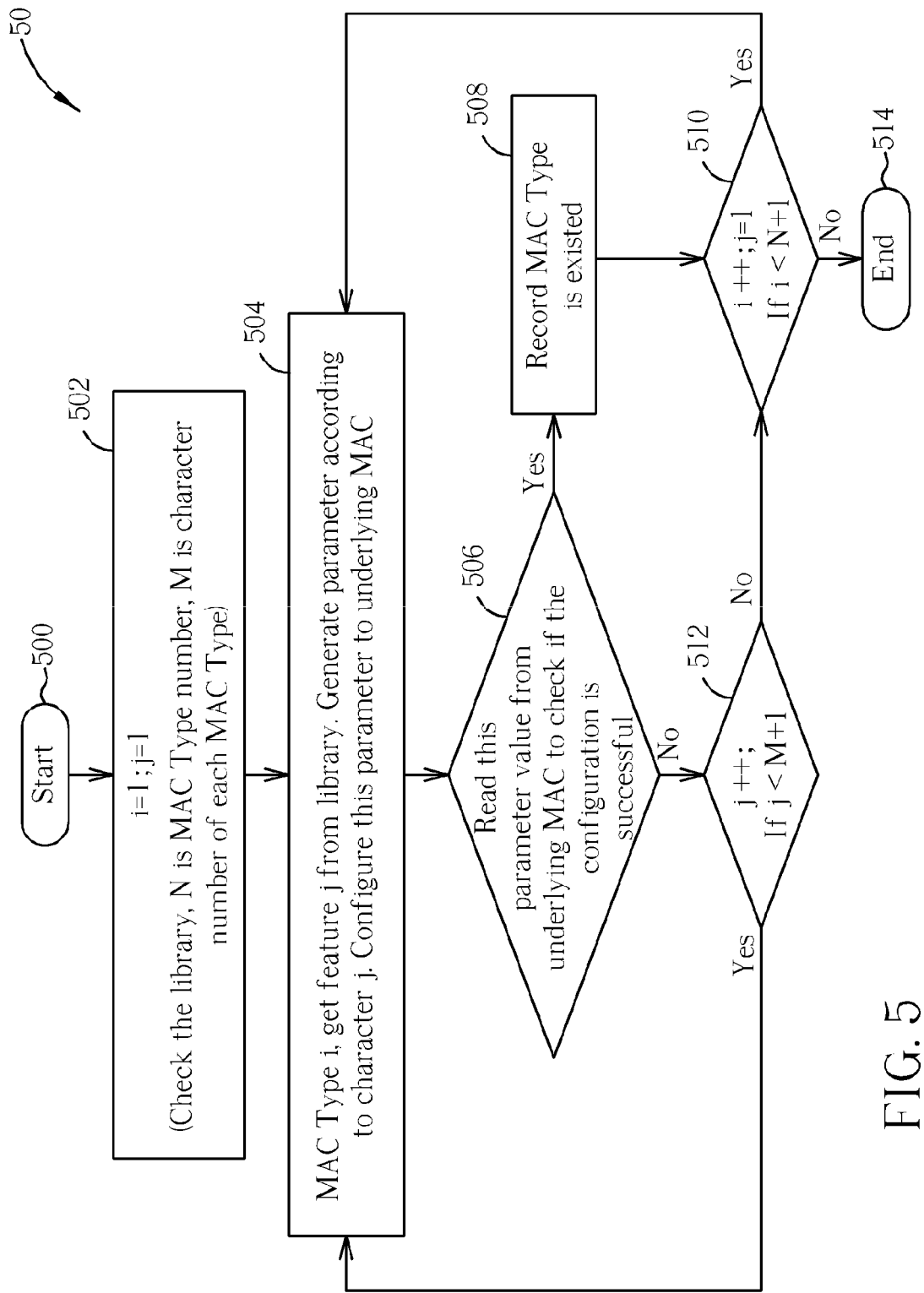
FIG. 5 is a schematic diagram of a MAC type auto detection process according to FIG. 4.

Please refer to FIG. 5, which illustrates a MAC type auto detection process 50 based on the library of FIG. 4. In FIG. 4, there are a number of N MAC types and a number of M characters of each MAC type. In FIG. 5, "i" is used as a MAC type index, where i=1, 2, ... N representing different MAC types, such as WiFi, Ethernet, PLC, and MoCA, and "j" is used as character index, where j=1, 2, ... M representing different characters for each MAC type, such as Speed/duplex, SSID, password and NPW. The MAC abstraction sub-layer firstly generates a first parameter according to a first character (i.e. j=1, representing character of Speed/duplex) of a first MAC type (i.e. i=1, representing MAC type of Ethernet), and then configures the first parameter to the underlying MAC layer (step 504). After that, the MAC abstraction sub-layer reads the parameter value from the underlying MAC layer to check if the configuration with the first parameter is successful (step 506). If the configuration with the first parameter is successful, the MAC abstraction sub-layer records that the first MAC type exists (step 508). On the other hand, if the configuration with the first parameter is not successful, the MAC abstraction sub-layer generates a second parameter according to a second character (i.e. j=2) of the first MAC type (i.e. i=1, representing MAC type of Ethernet), and then configures the second parameter to the underlying MAC layer (back to step 504). Note that, if all parameters generated according to characters (i.e. j=1–M) of the first MAC type (i.e. i=1) fail for configuration, the MAC abstraction sub-layer determines that the first MAC type does not exist. In addition, the MAC abstraction sub-layer generates parameters according to characters (i.e. j=1–M) of a second MAC type (i=2, representing MAC type of WiFi), and configures the parameters to the underlying MAC layer one by one. After configuring one parameter associated to one character of the second MAC type to the MAC layer, the MAC abstraction sub-layer reads the parameter value from the underlying MAC layer to check if the configuration is successful. If the configuration is successful, the MAC abstraction sub-layer records that the second MAC type exists. On the other hand, if the configuration is not successful, the MAC abstraction sub-layer configures another parameter associated to another character of the second MAC type, and performs the above-mentioned steps until all characters of all MAC types in the library are applied. With the concept of the MAC type auto detection process 50, MAC abstraction sub-layer knows which MAC type is underlying, and thereby can well control the MAC layer of the communication device 20.

Figure 6:
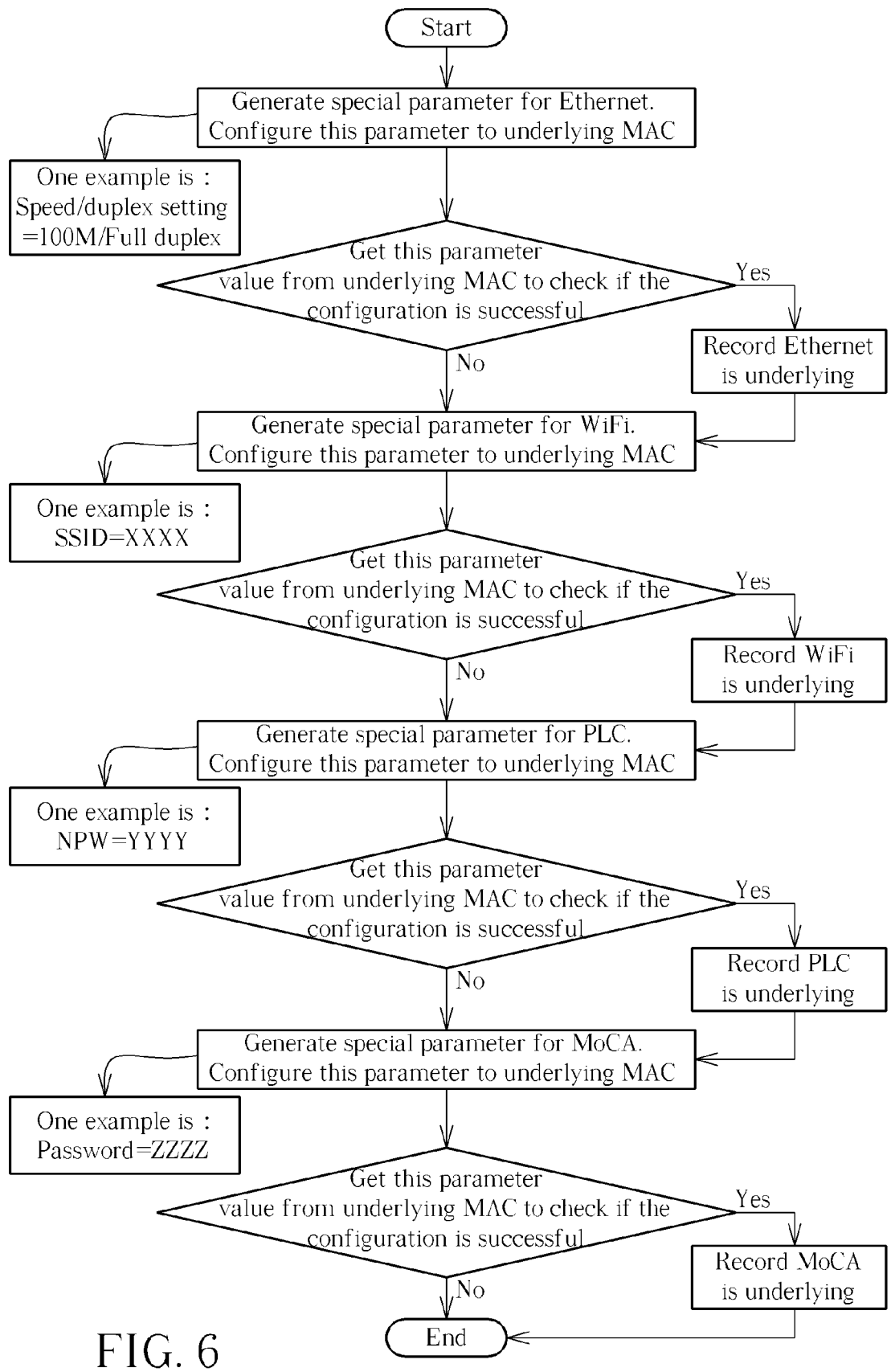
FIG. 6 is a schematic diagram of a MAC type auto detection process according to an example of the present invention.

Moreover, take another example based on the above description. Please refer to FIG. 6, which is a schematic diagram of a MAC type auto detection process according to an example of the present invention. Assure that a library includes 4 MAC types, such as Ethernet, WiFi, PLC and MoCA, and 1 character for each MAC type, such as speed/duplex, SSID, NPW and password. The MAC abstraction sub-layer generates a parameter according to the speed/duplex setting=100 M/Full duplex, for Ethernet, and configures this parameter to the underlying MAC layer. The MAC abstraction sub-layer gets this parameter value from the underlying MAC layer to check if the configuration is successful. If the configuration is successful, the MAC abstraction sub-layer records Ethernet is underlying. However, if the configuration is not successful, the MAC abstraction sub-layer determines that Ethernet is not underlying. In addition, the MAC abstraction sub-layer generate another parameter according to the SSID=xxxx, for WiFi, and configures it to the underlying MAC layer. The MAC abstraction sub-layer gets this parameter value from the underlying MAC layer to check if the configuration is successful. If the configuration is successful, the MAC abstraction sub-layer records WiFi is underlying, whereas if the configuration is not successful, the MAC abstraction sub-layer determines that WiFi is not underlying. Moreover, the MAC abstraction sub-layer generate another parameter according to the NPW=YYY, for PLC, and configures it to the underlying MAC layer. The MAC abstraction sub-layer gets this parameter value from the underlying MAC layer to check if the configuration is successful. If the configuration is successful, the MAC abstraction sub-layer records PLC is underlying. Similarly, if the configuration is not successful, the MAC abstraction sub-layer determines that PLC is not underlying and further generates another parameter according to the password=zzz, for MoCA, and configures it to the underlying MAC layer, and so on Please note that, those skilled in the art may realize the MAC type detection process by means of software, hardware or their combinations. More specifically, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of auto detecting the underlying MAC type in the MAC abstraction sub-layer. By knowing the underlying MAC type of the MAC layer, the MAC abstraction sub-layer can well control the MAC layer control of the communication device, and thereby configures proper parameters to the MAC layer of the communication device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of medium access control (MAC) type detection for a communication device compatible of a plurality of media each conformed to a communication standard in a network system, the method comprising:

generating a library including at least a character for each medium, wherein the step of generating the library comprises:
  extracting at least one dedicated character corresponding to a medium based on a communication standard; and
  including the at least one dedicated character in the library;
configuring a MAC layer of the communication device with a first parameter generated according to a first character of a first medium in the library;
determining the existence of the first medium according to the configuration result comprising determining whether configuration with the first parameter is successful; and
configuring the MAC layer with a second parameter generated according to a second character of the first medium in the library when it was determined that the configuration with the first parameter fails.

2. The method of claim 1, wherein the step of determining the existence of the first medium according to the configuration result further comprises:
  determining the first medium exists when the configuration with the first parameter is successful.

3. The method of claim 2, wherein the step of determining the existence of the first medium according to the configuration result comprises:
  determining the first medium exists when the configuration with the second parameter is successful.

4. The method of claim 1, wherein the communication standards comprises IEEE 1901, IEEE 802.11, IEEE 802.3, and Multimedia over Coax Alliance.

5. The method of claim 1, wherein the media include Ethernet, WiFi, PLC and MoCA.

6. The method of claim 1, wherein the characters include SSID, speed/duplex, NPW and password.

* * * * *